(12) United States Patent
Nojima et al.

(10) Patent No.: US 7,413,715 B2
(45) Date of Patent: Aug. 19, 2008

(54) CATALYST FOR REMOVING NITROGEN OXIDES

(75) Inventors: Shigeru Nojima, Hiroshima-ken (JP);
Kozo Iida, Hiroshima-ken (JP);
Yoshiaki Obayashi, Hiroshima-ken (JP);
Masashi Kiyosawa, Nagasaki-ken (JP);
Masanori Demoto, Nagasaki-ken (JP)

(73) Assignee: itsubishi Heavy Industries, Ltd., Tokyo (JP)

( * ) Notice: Subject to any disclaimer, the term of this patent is extended or adjusted under 35 U.S.C. 154(b) by 380 days.

(21) Appl. No.: 10/822,441

(22) Filed: Apr. 12, 2004

(65) Prior Publication Data

US 2005/0137082 A1 Jun. 23, 2005

(30) Foreign Application Priority Data

Apr. 18, 2003 (JP) ............................. 2003-113535
Nov. 27, 2003 (JP) ............................. 2003-396686

(51) Int. Cl.
*B01J 23/00* (2006.01)
*B01D 50/00* (2006.01)
*B01D 53/34* (2006.01)

(52) U.S. Cl. ....................... 422/170; 422/177; 502/309; 502/312; 502/319; 502/321; 502/350; 502/353

(58) Field of Classification Search ................. 502/305, 502/309, 312, 318, 319, 321, 331, 345, 346, 502/350, 353; 422/170, 177
See application file for complete search history.

(56) References Cited

U.S. PATENT DOCUMENTS

| | | | |
|---|---|---|---|
| 5,120,695 A * | 6/1992 | Blumrich et al. ............... 502/78 |
| 5,397,545 A * | 3/1995 | Balling et al. ................ 422/171 |
| 5,409,681 A * | 4/1995 | Kato et al. ................ 423/239.1 |
| 5,451,388 A * | 9/1995 | Chen et al. ............... 423/240 R |
| 5,451,558 A * | 9/1995 | Campbell et al. ............ 502/325 |
| 5,741,468 A * | 4/1998 | Saito et al. ................ 423/239.1 |
| RE36,171 E * | 3/1999 | Balling et al. ................ 422/171 |
| 5,945,372 A * | 8/1999 | Landgraf et al. ............. 502/350 |
| 6,248,689 B1 * | 6/2001 | Manson ....................... 502/340 |
| 6,774,080 B2 * | 8/2004 | LaBarge et al. .............. 502/170 |
| 6,930,072 B2 * | 8/2005 | Wachs et al. ................. 502/307 |
| 7,138,353 B2 * | 11/2006 | Takeshima et al. ............. 502/64 |
| 7,150,861 B2 * | 12/2006 | Morita et al. ............. 423/213.5 |
| 2002/0116920 A1* | 8/2002 | Pfeifer et al. .................. 60/299 |
| 2003/0175562 A1* | 9/2003 | Taguchi et al. ................. 429/19 |

FOREIGN PATENT DOCUMENTS

JP 01-151940 6/1989

* cited by examiner

*Primary Examiner*—Cam N. Nguyen
(74) *Attorney, Agent, or Firm*—Myers Bigel Sibley & Sajovec

(57) ABSTRACT

The present invention is to provide a catalyst for removing nitrogen oxides which is capable of keeping sufficient denitrification performance, i.e., a high removal rate of nitrogen oxides in exhaust gas having a high $NO_2$ content especially under conditions where the ratio of $NO_2/NO$ in exhaust gas is 1 or higher, a catalyst molded product therefor, and an exhaust gas treating method. The catalyst is designed for removing nitrogen oxides, which is used to denitrify exhaust gas containing nitrogen oxides having a high $NO_2$ content, which comprises: at least one kind of oxide selected from the group consisting of copper oxides, chromium oxides, and iron oxides as a component for reducing $NO_2$ to No; and which further comprises: at least one kind of titanium oxide; at least one kind of tungsten oxide; and at least one kind of vanadium oxide as components for reducing NO to $N_2$.

6 Claims, 2 Drawing Sheets

CATALYST FOR REMOVING NITROGEN OXIDES

CLAIM FOR PRIORITY AND CROSS-REFERENCE TO OTHER APPLICATIONS

This application claims priority from Japanese Patent Application No. 2003-113535; filed Apr. 18, 2003 and Japanese Application No. 2003-396686; filed Nov. 27, 2003, the disclosures of which are incorporated by reference herein in their entirety.

BACKGROUND OF THE INVENTION

1. Field of the Invention

The present invention relates to a catalyst for properly removing nitrogen oxides especially those having a high $NO_2$ content, a catalyst molded product therefor, and an exhaust gas treating method.

Also, the present invention relates to a combined cycle power generation facility having an exhaust gas system provided with a catalyst for properly removing nitrogen oxides especially having a high $CO_2$ content.

Generally, for nitrogen oxides contained in exhaust gas from a boiler etc., NO accounts for 80 to 90% by volume of the nitrogen oxides. As a denitrifying method for such exhaust gas, there is available a method in which a catalyst containing, for example, titanium (Ti), tungsten (W), or vanadium (V) as a main active component is used. In this denitrifying method, exhaust gas is caused to pass through the catalyst, and ammonia is added, by which denitrification is accomplished by the following reaction:

$$4NO+4NH_3+O_2 \rightarrow 4N_2+6H_2O \quad (i)$$

However, of various kinds of exhaust gases exhausted recently, exhaust gases from a gas turbine, diesel engine, and gas engine and further a chemical plant such as a nitrification plant, which have large fluctuations of load, sometimes have a higher $NO_2$ content than the NO content. Under conditions where the $NO_2$ content is high, especially under conditions where the ratio of $NO_2/NO$ is 1 or higher, a problem in that the function of the aforementioned catalyst is insufficient arises.

The catalyst for removing nitrogen oxides in accordance with Japanese Patent Provisional Publication No. 1-151940 (No. 151940/1989) filed by the applicant for the present invention has been developed as a catalyst for decomposing $NO_2$. However, this catalyst uses a composite oxide of copper and chromium, so that it is difficult to synthesize the oxide and also it is difficult to demonstrate reproducibility in terms of performance.

From the viewpoint of lowering air pollution, as a method for removing nitrogen oxides generated from a boiler and various combustion furnaces, a denitrifying method by catalytic reduction with ammonia, in which nitrogen oxides are decomposed into nitrogen and water in a contact manner with a catalyst by using ammonia as a reducing agent, has been used industrially as the most economical and efficient method. At present, many plants using this method are being operated.

As a catalyst used in this method, a tungsten oxide, vanadium oxide, molybdenum oxide, iron oxide, etc. are carried on a titanium oxide or an aluminum oxide. In the treatment of exhaust gas containing sulfur oxides, such as heavy oil or coal burning exhaust gas, a catalyst using a titanium oxide as a carrier is superior in terms of resistance to toxicity on sulfur oxides. At present, therefore, a titanium oxide-vanadium oxide-tungsten oxide catalyst is being used as an NOx removing catalyst (hereinafter referred to as denitrification catalyst) in many actual plants because it is excellent in performance and durability.

In a boiler, gas turbine, or gas turbine combined cycle for power generation, a load fluctuating operation is routinely performed according to a change in quantity of generated power. At high load time, there is no hindrance because almost all NOx in exhaust gas exists as NO, but at low load time, almost all NOx in exhaust gas exists as $NO_2$. Therefore, a decrease in NOx removal efficiency of the denitrifier using a denitrification catalyst may frequently pose a problem of smoke color caused by increased concentration of NOx in stack outlet gas.

The inventors of the present invention experimentally analyzed the titanium oxide-vanadium oxide-tungsten oxide catalyst in a reaction between NO and $NH_3$ expressed by the following formula (1), a reaction between $NO_2/NO$ mixing gas and $NH_3$ expressed by formula (2), and a reaction between $NO_2$ and $NH_3$ expressed by formula (3).

$$4NO+4NH_3+O_2 \rightarrow 4N_2+6H_2O \quad (1)$$

$$NO+NO_2+2NH_3 \rightarrow 2N_2+3H_2O \quad (2)$$

$$6NO_2+8NH_3 \rightarrow 7N_2+12H_2O \quad (3)$$

As a result, it was revealed that in the case where the mole ratio of $NO_2/NO$ is 1 or higher or in the case of only $NO_2$, the NOx removal efficiency of the conventional titanium oxide-vanadium oxide-tungsten oxide catalyst (hereinafter referred to as catalyst A) decreases significantly, and it was found that a titanium oxide-vanadium oxide-tungsten oxide-copper oxide/chromium oxide composite oxide (hereinafter referred to as catalyst B) that takes the place of catalyst A is effective (Japanese Patent Provisional Publication No. 1-151940 (No. 151940/1989)).

In the gas turbine or gas turbine combined cycle, the $NO_2/NO$ mole ratio varies relatively widely corresponding to a load fluctuation. At a high load time, almost all NOx is NO and the amount of $NO_2$ is small. On the other hand, at a low load time the amount of $NO_2$ increases while the amount of NO is small.

Catalyst A of the conventional composition exhibits a high NOx removal rate when NO concentration is high and $NO_2$ concentration is low. However, when $NO_2$ concentration is high and NO concentration is low, the NOx removal rate decreases, so that the NOx removal rate in the case of high $NO_2/NO$ ratio is assumed in designing a denitrifier, so that the amount of catalyst increases, which is economically disadvantageous.

Catalyst B exhibits a high NOx removal rate regardless of variation in the $NO_2/NO$ ratio. However, catalyst B is more expensive than the conventional catalyst A. Therefore, to replace the conventional catalyst A with catalyst B by disposing of catalyst A is economically disadvantageous, so that some measures are demanded.

Also, when a denitrifier is already operating smoothly using catalyst A of the conventional composition in a state in which a decrease in catalyst performance is scarcely recognized and the catalyst can still be used continuously, measures for restraining the generation of an alarm about increased concentration of exhausted NOx caused by an increase in $NO_2$ concentration at low load time are demanded while the existing denitrification catalyst is made use of to the utmost.

SUMMARY OF THE INVENTION

The present invention has been made to solve the above problems, and accordingly an object thereof is to provide a catalyst for removing nitrogen oxides which is capable of keeping sufficient denitrification performance, i.e., a high removal rate of nitrogen oxides in exhaust gas having a high $NO_2$ content especially under conditions where the ratio of $NO_2/NO$ in exhaust gas is 1 or higher, a catalyst molded product therefor, and an exhaust gas treating method.

Another object of the present invention is to provide a catalyst for removing nitrogen oxides which solves a problem with the conventional method for removing nitrogen oxides in exhaust gas and is capable of always keeping high NOx removal performance especially without being affected by the variations in NO concentration and $NO_2$ concentration in exhaust gas, a catalyst molded product therefor, and an exhaust gas treating method.

Still another object of the present invention is to provide a combined cycle power generation facility having an exhaust gas treating system capable of keeping a high nitrogen oxides removal rate.

The inventors conducted studies earnestly, and resultantly found out that if at least one kind of copper (Cu) oxides, chromium (Cr) oxides, and iron (Fe) oxides is contained, sufficient denitrification performance can be obtained even for the exhaust gas having a high $NO_2$ content.

In accordance with the present invention, there is provided a catalyst for removing nitrogen oxides, which is used to denitrify exhaust gas containing nitrogen oxides having a high $NO_2$ content, which comprises: at least one kind of oxide selected from the group consisting of copper oxides, chromium oxides, and iron oxides; and which further comprises: at least one kind of titanium oxide; at least one kind of tungsten oxide; and at least one kind of vanadium oxide.

The present invention provides, as another mode, a catalyst for removing nitrogen oxides, which is used to denitrify exhaust gas containing nitrogen oxides having a high $NO_2$ content, which comprises: at least one kind of oxide selected from the group consisting of copper oxides, chromium oxides, and iron oxides as a component for reducing $NO_2$ to NO; and which further comprises: at least one kind of titanium oxide; at one kind of tungsten oxide; and at least one kind of vanadium oxide as components for reducing NO to $N_2$.

When the component for reducing $NO_2$ to NO consists of a copper oxide, the catalyst for removing nitrogen oxides contains the oxides so as to contain 5 to 23 tungsten, 0.1 to 5 vanadium, and 5 or less copper with respect to 100 titanium in atomic ratio.

When the component for reducing $NO_2$ to NO consists of a chromium oxide, the catalyst for removing nitrogen oxides contains the oxides so as to contain 5 to 23 tungsten, 0.1 to 5 vanadium, and 5 or less chromium with respect to 100 titanium in atomic ratio.

When the component for reducing $NO_2$ to NO consists of an iron oxide, the catalyst for removing nitrogen oxides contains the oxides so as to contain 5 to 23 tungsten, 0.1 to 5 vanadium, and 5 or less iron with respect to 100 titanium in atomic ratio.

The present invention provides, as another aspect, a catalyst molded product for a catalyst for removing nitrogen oxides, which is obtained by mixing the component for reducing NO to $N_2$ with the component for reducing $NO_2$ to NO.

Such a catalyst molded product can be manufactured by carrying the component for reducing $NO_2$ to NO on a molded product molded by using the component for reducing NO to $N_2$. Also, such a catalyst molded product can be manufactured by carrying the component for reducing $NO_2$ to NO on the component for reducing NO to $N_2$ and then by molding.

The present invention provides, as still another aspect, an exhaust gas treating method using the catalyst for removing nitrogen oxides. In such an exhaust gas treating method, the $NO_2/NO$ ratio in exhaust gas to be treated is generally 1 or higher. Also, the $O_2$ concentration in exhaust gas to be treated is generally 6 vol % or higher.

Also, the present invention provides a catalyst for removing nitrogen oxides characterized by comprising a molybdenum oxide, or characterized by comprising a molybdenum oxide as a component for reducing NO to $N_2$.

Also, the inventors earnestly carried on studies on a method for removing nitrogen oxides in exhaust gas, in which high NOx removal performance is always maintained even if the $NO_2$ concentration in exhaust gas increases while catalyst A of the conventional composition, which is charged into the existing denitrifier and is being operated smoothly in a state in which a decrease in catalyst performance is scarcely recognized, is made use of to the utmost. As a result, it was found that a combination of catalyst A of the conventional composition and catalyst B which achieves high NOx removal performance even if the mole ratio of $NO_2/NO$ becomes 1.0 or higher ($NO_2$ concentration increases) can be applied to a wide range of NOx concentration from NO rich state at high load to $NO_2$ rich state at low load. Thereby, the present invention has been completed.

A configuration of catalyst for-removing nitrogen oxides for achieving the above object is characterized in that in a catalyst for removing nitrogen oxides which removes nitrogen oxides in exhaust gas by reduction in the presence of ammonia, a first catalyst (catalyst B) which is highly active in removing nitrogen dioxide is arranged on the upstream side in the exhaust gas flow direction, and a second catalyst (catalyst A) which is highly active in removing nitrogen monoxide is arranged on the downstream side of the first catalyst (catalyst B) in the exhaust gas flow direction.

Another configuration of catalyst for removing nitrogen oxides for achieving the above object is characterized in that in a catalyst for removing nitrogen oxides which removes nitrogen oxides in exhaust gas by reduction in the presence of ammonia, a first catalyst (catalyst B) which is highly active in removing nitrogen dioxide is arranged on the upstream side in the exhaust gas flow direction, and a second catalyst (catalyst A) which is highly active in removing nitrogen monoxide is arranged on the downstream side of the first catalyst (catalyst B) in the exhaust gas flow direction; and as the second catalyst (catalyst A), a catalyst comprising a titanium oxide as a first component and at least one or more kinds of vanadium oxide, tungsten oxide, and molybdenum oxide as a second component is applied, and as the first catalyst (catalyst B), a catalyst in which the second catalyst (catalyst A) comprises at least one or more kinds of copper oxide and chromium oxide as a third component is applied.

Still another configuration of catalyst for removing nitrogen oxides for achieving the above object is characterized in that in a catalyst for removing nitrogen oxides which removes nitrogen oxides in exhaust gas by reduction in the presence of ammonia, a second catalyst (catalyst A) consisting of a catalyst comprising a titanium oxide as a first component and a vanadium oxide and a tungsten oxide as second components, and a first catalyst (catalyst B) consisting of a catalyst in which the second catalyst (catalyst A) comprises a composite oxide of copper oxide and chromium oxide as a third component are arranged in combination.

Still another configuration of catalyst for removing nitrogen oxides for achieving the above object is characterized in that in a catalyst for removing nitrogen oxides which removes nitrogen oxides in exhaust gas by reduction in the presence of ammonia, a second catalyst (catalyst A) consisting of a catalyst comprising a titanium oxide as a first component and a vanadium oxide and a tungsten oxide as second components, and a first catalyst (catalyst B) consisting of a catalyst in which the second catalyst (catalyst A) comprises a composite oxide of copper oxide and chromium oxide as a third component are combined; and the first catalyst (catalyst B) is arranged on the upstream side in the exhaust gas flow direction, and the second catalyst (catalyst A) is arranged on the downstream side of the first catalyst (catalyst B) in the exhaust gas flow direction.

Also, the catalyst for removing nitrogen oxides is characterized in that the catalyst comprises a molybdenum oxide as the second component of the second catalyst (catalyst A).

A configuration of catalyst for removing nitrogen oxides for achieving the above object is characterized in that in a catalyst for removing nitrogen oxides which removes nitrogen oxides in exhaust gas by reduction in the presence of ammonia, a second catalyst (catalyst A) consisting of a catalyst comprising a titanium oxide as a first component and at least one or more kinds of vanadium oxide, tungsten oxide, and molybdenum oxide as a second component, and a first catalyst (catalyst B) consisting of a catalyst in which the second catalyst (catalyst A) comprises at least one or more kinds of copper oxide and chromium oxide as a third component are arranged in combination.

Also, the catalyst for removing nitrogen oxides is characterized in that at least not less than ¼ and less than ¾ of an upstream catalyst flow path length in the exhaust gas flow direction is constituted by the second catalyst (catalyst A), and a downstream catalyst flow path length in the exhaust gas flow direction is constituted by the first catalyst (catalyst B).

The present invention is characterized in that in an exhaust gas treating method for denitrifying exhaust gas containing $NO_2$ in the presence of ammonia, $NO_2$ is reduced to NO by an oxide of at least one or more kinds of copper oxide and chromium oxide, and NO is reduced to $N_2$ by an oxide of at least one or more kinds of vanadium oxide, tungsten oxide, and molybdenum oxide and a titanium oxide. The present invention provides an exhaust gas treating method using the above-described catalyst for removing nitrogen oxides.

A configuration of a combined cycle power generation facility for achieving the above object is characterized by comprising a compressor for compressing air; burning means for burning compressed air compressed by the compressor and a fuel; a gas turbine for generating electric power by expanding combustion gas sent from the burning means to obtain an output; an exhaust heat recovery boiler in which exhaust from the gas turbine is sent and steam is generated, and the catalyst for removing nitrogen oxides according to any one of claims 17 to 23 is arranged; a steam turbine for generating electric power by expanding steam generated by the exhaust heat recovery boiler to obtain an output; condensing means for condensing exhaust steam of the steam turbine; and supply means for supplying condensed water condensed by the condensing means to the exhaust heat recovery boiler.

As is apparent from the above, according to the present invention, there are provided a catalyst for removing nitrogen oxides, which is capable of keeping sufficient denitrification performance, i.e., a high removal rate of nitrogen oxides in exhaust gas having a high $NO_2$ content especially under a condition that the ratio of $NO_2/NO$ in exhaust gas is 1 or higher, a catalyst molded product therefor, and an exhaust gas treating method.

In the catalyst for removing nitrogen oxides and the exhaust gas treating method in accordance with the present invention, catalyst B excellent in $NO_2$ removal performance and catalyst A of the conventional composition excellent in NO removal performance are arranged in combination, and in exhaust gas in which the NO concentration and $NO_2$ concentration vary greatly due to load fluctuations, high NOx removal performance can be maintained for all loads. Also, when a denitrification catalyst is charged into the existing denitrifier and is being operated smoothly in a state in which a decrease in catalyst performance is scarcely recognized, and the catalyst can still be used continuously, the existing denitrification catalyst is taken out, and a composite oxide of copper and chromium is impregnatingly carried thereon, subsequently the produced catalyst being recharged. Thereby, the existing denitrification catalyst can be reused, by which effective utilization of resources is achieved, and hence a more economical catalyst for removing nitrogen oxides and exhaust gas treating method are provided.

Also, a combined cycle power generation facility is provided in which catalyst B excellent in $NO_2$ removal performance and catalyst A of the conventional composition excellent in NO removal performance are arranged in combination, and in exhaust gas in which the NO concentration and $NO_2$ concentration are varied greatly by load fluctuations, high NOx removal performance can be maintained for all loads.

DETAILED DESCRIPTION OF THE PREFERRED EMBODIMENTS

Figure 1:
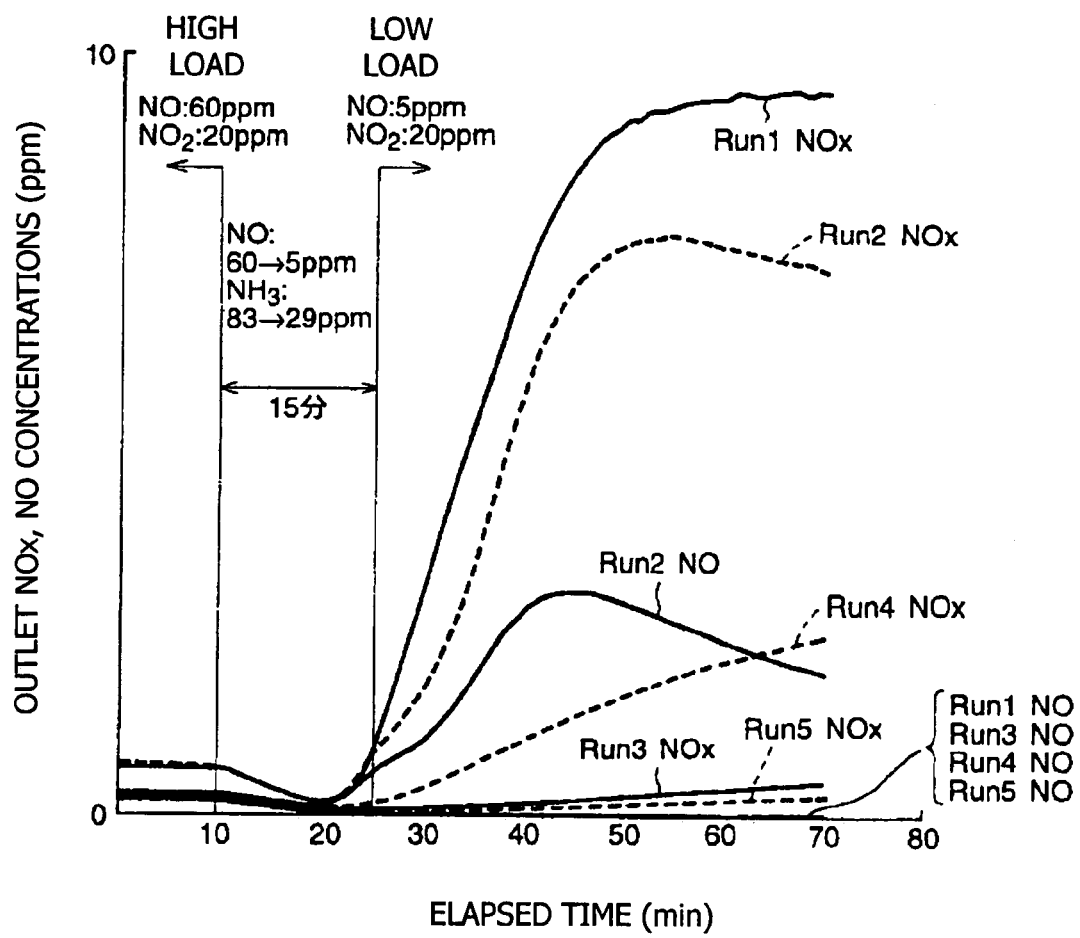
FIG. 1 is a graph showing a change with time of outlet NOx concentration which shows the effect of the nitrogen oxides removing method of the present invention.

Embodiments of a catalyst for removing nitrogen oxides, a catalyst molded product therefor, and an exhaust gas treating method in accordance with the present invention will now be described in detail.

The catalyst for removing nitrogen oxides in accordance with the present invention is used to denitrify exhaust gas containing nitrogen oxides having a high $NO_2$ content. In particular, this catalyst is suitable for treating exhaust gas having an $NO_2/NO$ ratio of 1 or higher. Also, this catalyst is suitable for treating exhaust gas having an $O_2$ concentration of 6 vol % or higher.

The catalyst for removing nitrogen oxides in accordance with the present invention contains at least one kind selected from the group consisting of copper oxides, chromium oxides, and iron oxides as a component for reducing $NO_2$ to NO.

As a copper source for copper oxides, copper sulfate, copper nitrate, etc. can be cited. As a chromium source for chromium, chromium sulfate, chromium nitrate, chromic acid, ammonium bichromate, etc. can be cited. Also, as an iron source for iron oxides, iron nitrate, iron chloride, iron sulfide, etc. can be cited. From these raw materials, slurry, aqueous solution, etc. for preparing catalyst as in the Examples, described later, can be prepared.

At least one kind of copper oxides, chromium oxides, and iron oxides suffices. Specifically, the presence of only one kind can achieve a sufficiently high removal rate even if the nitrogen oxides have a high $NO_2$ content. In other words, there is no need for using a composite oxide, which is difficult to prepare. Conditions permitting, two kinds or all three kinds of these oxides can be contained.

Also, the catalyst for removing nitrogen oxides in accordance with the present invention contains at least one kind of titanium oxide, at least one kind of tungsten oxide, and at least one kind of vanadium oxide as components for reducing NO to $N_2$.

As a titanium source for titanium oxides, an inorganic titanium compound such as titanium chloride and titanium sulfate, an organic titanium compound such as titanium oxalate and tetraalkoxytitanium, etc. can be cited. As a vanadium source for vanadium oxides, oxides of vanadium, vanadyl sulfate, vanadyl oxalate, ammonium metavanadate, etc. can be cited. As a tungsten source for tungsten oxides, ammonium paratungstate, ammonium metatungstate, etc. can be cited. From these raw materials, slurry, aqueous solution, etc. for preparing catalyst as in the Examples, described later, can be prepared.

Further, in preparing the above-described slurry, aqueous solution, etc. and performing molding, a clay-based inorganic substance such as montmorillonite, acid clay, bentonite, kaolin, halloysite, and sericite, or an inorganic fiber-form substance such as glass wool, glass fiber, rock wool, and ceramic fiber can be added to improve the moldability and strength of catalyst. Also, an organic binder such as cellulose acetate can also be added. However, from the viewpoint of catalyst activity, it is preferable that the content of a component for these additives with respect to oxides for achieving the catalyst activity be 30 wt % or lower of the total amount of complete catalyst molded product.

In order to obtain a catalyst molded product by using the catalyst for removing nitrogen oxides in accordance with the present invention, a method described below can be used.

As one method, a catalyst molded product can be obtained through a process for preparing slurry, aqueous solution, etc. containing a component for reducing NO to $N_2$ and slurry, aqueous solution, etc. containing a component for reducing $NO_2$ to NO and further through a process for mixing these components.

For example, from the aforementioned titanium source, a paste-form titanium compound such as paste-form titanium hydroxide is obtained. Proper aqueous solutions prepared from the tungsten source and vanadium source, for example, methylamine solution of ammonium paratungstate and methylamine solution of ammonium metavanadate are prepared. Subsequently, these solutions are added in the intended atomic ratio, and are kneaded. The obtained kneaded substance is dried and fired, by which a fired body of oxides containing titanium oxides, tungsten oxides, and vanadium oxides is obtained.

The firing operation after drying is generally one mode of evaporation to hardness.

Further, at least one slurry is obtained through a process in which at least one aqueous solution is prepared from the aforementioned chromium source, copper source, and iron source, and the pH is regulated by dripping aqueous ammonia, whereby at least one slurry is obtained.

A crushed substance obtained by crushing the aforementioned fired body and at least one of the aforementioned slurries are mixed with each other and kneaded. This product is molded into, for example, a honeycomb shape. After being dried, the molded product is fired to obtain a honeycomb catalyst. When or after the substance is kneaded, an additive such as glass fiber or an organic binder can further be added.

As a molded product, a molded product having such a honeycomb construction is a typical example. However, the molded product is not limited to one having this construction.

Also, a catalyst molded product can be manufactured by carrying a component for reducing $NO_2$ to NO on a molded product molded by using a component for reducing NO to $N_2$. What is called a two-layer construction type can be molded.

In order to mold a catalyst by using a component for reducing NO to $N_2$, for example, slurry or aqueous solution containing a component serving as a raw material for catalyst component is prepared and extrusion molded, and the product molded so as to have a predetermined construction is evaporated to dryness (for example, dried, fired). In this case as well, a honeycomb construction obtained by extrusion molding can be used. For example, from the aforementioned titanium source, a paste-form titanium compound such as paste-form titanium hydroxide is obtained. Proper aqueous solutions prepared from the tungsten source and vanadium source, for example, methylamine solution of ammonium paratungstate and methylamine solution of ammonium metavanadate are prepared. Subsequently, these solutions are added in the intended atomic ratio, and are kneaded. The kneaded substance is extrusion molded, and the product molded so as to have a honeycomb construction is dried and fired to obtain a honeycomb molded product. When or after the substance is kneaded, an additive such as glass fiber or an organic binder can further be added. Also, an additive such as silica sol can be added to paste-form sodium hydroxide.

In order to carry a component for reducing $NO_2$ to NO, for example, slurry or aqueous solution containing a component serving as a raw material for catalyst component is prepared, and the aforementioned molded product is coated (impregnated) with the prepared substance and is dried. For example, at least one aqueous solution is prepared from the aforementioned chromium source, copper source, and iron source, and the molded product is impregnated with this aqueous solution and is dried, by which a catalyst molded product can be obtained.

When a copper oxide is contained as a component for reducing $NO_2$ to NO, it is preferable that the completed catalyst molded product contain the oxides so as to contain 5 to 23 tungsten, 0.1 to 5 vanadium, and 5 or less copper with respect to 100 titanium in atomic ratio. A lower limit of 0.1 copper with respect to 100 titanium in atomic ratio is preferable.

When a chromium oxide is contained as a component for reducing $NO_2$ to NO, it is preferable that the completed catalyst molded product contain the oxides so as to contain 5 to 23 tungsten, 0.1 to 5 vanadium, and 5 or less chromium with respect to 100 titanium in atomic ratio. A lower limit of 0.1 chromium with respect to 100 titanium in atomic ratio is preferable.

When an iron oxide is contained as a component for reducing $NO_2$ to NO, it is preferable that the completed catalyst molded product contain the oxides so as to contain 5 to 23 tungsten, 0.1 to 5 vanadium, and 5 or less iron with respect to 100 titanium in atomic ratio. A content of 0.1 to 5 iron with respect to 100 titanium in atomic ratio is preferable.

When all of copper oxide, chromium oxide, and iron oxide are contained, it is preferable that the completed catalyst molded product contain the oxides so as to contain 5 to 23 tungsten, 0.1 to 5 vanadium, and 0.1 to 15 total of copper, chromium, and iron with respect to 100 titanium in atomic ratio.

In the exhaust gas treating method in accordance with the present invention, the aforementioned copper oxides, chromium oxides, and iron oxides reduce $NO_2$ to NO according to the following reaction formula:

$$NO_2 \rightarrow NO + \tfrac{1}{2}O_2 \qquad (ii)$$

The ammonia added to the exhaust gas also reduces $NO_2$ as expressed by the following formula:

$$NO_2 + 2NH_3 + O_2 \rightarrow NO + N_2 + 3H_2O \qquad (iii)$$

The titanium oxides, tungsten oxides, and vanadium oxides reduce NO to $N_2$ by the addition of ammonia to exhaust gas as expressed by the following formula:

$$4NO + 4NH_3 + O_2 \rightarrow 4N_2 + 6H_2O \qquad (i)$$

(shown before)

The configuration in which the catalyst molded product is molded into a honeycomb shape and exhaust gas caused to pass through the penetrating hole portion is superior from the viewpoints of construction strength and denitrification efficiency of catalyst. The temperature of exhaust gas that is caused to pass is preferably 230 to 430° C. The reaction time is selected from a range of 1000 to 100,000 $Nm^3$/hr per unit cubic meter of catalyst. The reaction pressure may be atmospheric pressure, reduced pressure, or increased pressure, and is not subject to any special restriction.

As the exhaust gas to be treated, exhaust gases from a gas turbine, diesel engine, and gas engine can be cited as examples.

In order to prepare catalyst A (titanium oxide-vanadium oxide-tungsten oxide), which is the above-described second catalyst, a titanium source can be selected from inorganic titanium compounds such as titanium chloride and titanium sulfate and organic titanium compounds such as titanium oxalate and tetraalkoxytitanium. A vanadium source can be selected from vanadium oxides, vanadyl sulfate, vanadyl oxalate, ammonium metavanadate, etc. A tungsten source can be selected from ammonium paratungstate, ammonium metatungstate, etc.

Further, to improve the moldability and strength of catalyst, a clay-based inorganic substance such as montmorillonite, acid clay, bentonite, kaoline, halloysite, and sericite, or an inorganic fiber-form substance such as glass wool, glass fiber, rock wool, and ceramic fiber is preferably added to the principal component of carrier in an amount of 30 wt %. The catalyst shape may be either a granular shape or a honeycomb shape. The granular catalyst may be formed by either the kneading method in which titanium oxide of a carrier component and vanadium oxide-tungsten oxide of a catalyst component are kneaded or the impregnation method in which a catalyst component is impregnatingly carried after a carrier is formed.

The honeycomb catalyst may be either of a coat type in which the above-described carrier component and catalyst component are mixed and slurried to be coatingly carried on a heat resistant honeycomb base material such as cordierite, mullite, and silica or of a solid type in which the above-described carrier component and catalyst component are mixed homogeneously and extrusion molded into a honeycomb structure. Generally, the weight ratios of vanadium oxide and tungsten oxide with respect to titanium oxide of 0.001 to 0.1 and 0.01 to 0.2, respectively, are best suitable in terms of economy and performance.

In order to prepare catalyst B (titanium oxide-vanadium oxide-tungsten oxide-copper oxide/chromium oxide composite oxide), which is the first catalyst, a copper source can be selected from copper sulfate, copper nitrate, etc., and a chromium source can be selected from chromium sulfate, chromium nitrate, chromic acid, ammonium dichromate, etc. Although, like catalyst A, catalyst B may be granulated and formed by mixing the raw materials, it is generally produced by a method in which a solution containing a copper source and a chromium source is impregnatingly carried on the above-described catalyst A. The mixing ratio of composite oxide of copper compound and chromium compound with respect to titanium oxide by oxide-converted weight ratio should be in the range of 0.002 to 0.2, preferably 0.01 to 0.1. Catalyst B may be prepared newly. However, when the catalyst A having been used for a long period of time in a denitrifier in a state in which a decrease in catalyst performance is scarcely recognized and can still be used continuously, the catalyst A is taken out, and a solution containing a copper source and a chromium source is impregnatingly carried on the taken catalyst A, by which catalyst B can be recharged after being fired. This method is preferred from the viewpoint of effective utilization of resources and economy.

Replacement of all catalysts with catalyst B is unfavorable because of the increase in catalyst manufacturing cost and replacing cost. The arrangement of catalysts A on the downstream side of catalysts B of the present invention, which is excellent in $NO_2$ removal performance, can achieve a sufficient effect in practical use. Although catalysts A and catalysts B are usually arranged half and half, catalysts B may be increased or decreased in the range not less than ¼ and less than ¾ according to the increase/decrease in $NO_2$ concentration (the arrangement of catalyst B only in the range of ¼ on the upstream side can achieve an effect).

WORKING EXAMPLES

Example 1

(Preparation of Catalyst)

Honeycomb Catalyst 1

One thousand five hundred grams of aqueous solution of $TiOSO_4$ of $TiO_2$ converted concentration 15% was cooled to 20° C. or lower, and neutralized with the pH being 8 by adding 15% aqueous ammonia gradually. The yielded titanium hydroxide precipitate was rinsed and filtered, by which paste-form titanium hydroxide 1 was obtained. Methylamine solution of ammonium paratungstate and ammonium metavanadate was added to this paste-form titanium hydroxide in a ratio of (Ti:W:V=100:9:3 (atomic ratio)), and was kneaded and agitated sufficiently. This kneaded substance was fired at 500° C. for five hours after being dried to obtain $TiO_2 \cdot WO_3 \cdot V_2O_5$ oxide 1.

Separately, aqueous ammonia was dripped to aqueous solution of ammonium dichromate $((NH_4)_2Cr_2O_7)$, copper nitrate $(Cu(NO_3)_2 \cdot 3H_2O)$, and iron nitrate $(Fe(NO_3)_3 \cdot 6H_2O)$ and the aqueous solution was agitated, and precipitate was formed so that the pH was constant, being 7, by which slurry solution 1 was obtained.

Next, the aforementioned oxide 1 and cake 1 obtained by filtering slurry solution 1 were kneaded by a kneader, by which kneaded substance 1 was obtained. The composition of cake 1 in this case was Ti:Cr:Cu:Fe=100:3:2:1 with respect to Ti of oxide 1. Kneading was performed by adding glass fiber, an organic binder (cellulose acetate), and water to kneaded substance 1, and a honeycomb with a pitch of 5 mm and a wall thickness of 1.0 mm was molded by using a honeycomb molding machine. The contents of kneaded substance 1, glass fiber, organic binder, and water were 100:2:3:25 (by weight) with respect to kneaded substance 1. After being dried, this honeycomb molded product was fired in air at 500° C. for three hours, by which honeycomb catalyst 1 was obtained.

Honeycomb Catalyst 2 to 9

In the method for preparing the above-described honeycomb catalyst 1, honeycomb catalysts 2 to 7 having the following composition in which the added amount of chromium, copper, and iron is different were prepared. As oxide 1, the same oxide was used, and as the honeycomb molding method, a method that is the same as the method for honeycomb catalyst 1 was used. However, for ammonium dichromate (($NH_4$)$_2Cr_2O_7$), copper nitrate ($Cu(NO_3)_2 \cdot 3H_2O$), and iron nitrate ($Fe(NO_3)_3 \cdot 6H_2O$), at least one of these was used so as to correspond to each prepared honeycomb catalyst. For example, for honeycomb catalyst 9, only iron nitrate was used.
Honeycomb catalyst 2: Ti:Cr:Cu:Fe=100:4:3:2
Honeycomb catalyst 3: Ti:Cr:Cu:Fe=100:3:2:0.3
Honeycomb catalyst 4: Ti:Cr:Cu:Fe=100:2:0:1
Honeycomb catalyst 5: Ti:Cr:Cu:Fe=100:2:2:0
Honeycomb catalyst 6: Ti:Cr:Cu:Fe=100:0:2:2
Honeycomb catalyst 7: Ti:Cr:Cu:Fe=100:4:0:0
Honeycomb catalyst 8: Ti:Cr:Cu:Fe=100:0:4:0
Honeycomb catalyst 9: Ti:Cr:Cu:Fe=100:0:0:3

Honeycomb Catalyst 10 to 12

In the process for preparing slurry solution 1, which has been explained in preparing the aforementioned honeycomb catalyst 1, aqueous solution of metal was prepared without the addition of ammonia and without yielding precipitates of chromium, copper, and iron. This aqueous solution was directly carried on crushed substance of oxide 1 by the impregnation method to yield carrier 1. This carrier 1 was honeycomb molded by the same method as that for honeycomb catalyst 1 to yield honeycomb catalyst 10. This honeycomb catalyst 10 has the same composition as that of honeycomb catalyst 1. Honeycomb catalysts 11 to 12 having different compositions were prepared by the same method. The compositions of honeycomb catalysts 10 to 12 are shown below.
Honeycomb catalyst 10: Ti:Cr:Cu:Fe=100:3:2:1
Honeycomb catalyst 11: Ti:Cr:Cu:Fe=100:4:3:2
Honeycomb catalyst 12: Ti:Cr:Cu:Fe=100:3:2:0.2

Honeycomb Catalyst 13

When oxide of $TiO_2 \cdot WO_3 \cdot V_2O_5$ was prepared by the same method as that for the aforementioned honeycomb catalyst 1, silica sol (Snowtex-O) was added to past-form titanium hydroxide 1 in a ratio of T:Si=100:10 (atomic ratio), and $TiO_2 \cdot SiO_2 \cdot WO_3 \cdot V_2O_5$ oxide was prepared by the same method as that for honeycomb catalyst 1. Further, the oxide was kneaded by adding chromium, copper, and iron by the same method as that for honeycomb catalyst 1, and was honeycomb molded by the same method as that for honeycomb catalyst 1 to form a catalyst. This catalyst was called honeycomb catalyst 13.

Comparative Honeycomb Catalyst 1

In preparing the aforementioned honeycomb catalyst 1, only oxide of $TiO_2 \cdot WO_3 \cdot V_2O_5$ was honeycomb molded without the addition of chromium, copper, and iron by the same method as that for honeycomb catalyst 1 to yield comparative honeycomb catalyst 1.

Example 2

(Denitrification Performance Test)

Denitrification performance tests were conducted on honeycomb catalysts 1 to 13 and comparative honeycomb catalyst 1 obtained in Example 1 under the conditions described below. The test results (denitrification rate, $SO_2$ oxidation rate) are given in Table 1.
Catalyst shape: 5 cm×5 cm×100 cm honeycomb shape (volume 2.5 L)
Gas amount: 25 $Nm^3$/h (GHSV 10,000h-1)
Temperature: 280° C., 350° C.
Gas composition (1):
NO: 190 ppm, $NO_2$: 10 ppm, $NH_3$: 200 ppm, $O_2$: 4%, $CO_2$: 12%, $H_2O$: 10%, $N_2$: balance
Gas composition (2):
NO: 10 ppm, $NO_2$: 190 ppm, $NH_3$: 240 ppm, $O_2$: 4%, $CO_2$: 12%, $H_2O$: 10%, $N_2$: balance

TABLE 1

| Honeycomb catalyst No. | Catalyst Composition | Co-catalyst carrying method | Gas Composition (1) 280° C. | Gas Composition (1) 350° C. | Gas Composition (2) 280° C. | Gas Composition (2) 350° C. |
|---|---|---|---|---|---|---|
| 1 | Ti, W, V, Cr, Cu, Fe | Kneading method | 83 | 92 | 79 | 83 |
| 2 | Ti, W, V, Cr, Cu, Fe | Kneading method | 82 | 89 | 78 | 84 |
| 3 | Ti, W, V, Cr, Cu, Fe | Kneading method | 82 | 90 | 78 | 82 |
| 4 | Ti, W, V, Cr, Fe | Kneading method | 81 | 91 | 75 | 82 |
| 5 | Ti, W, V, Cr, Cu | Kneading method | 78 | 90 | 75 | 84 |
| 6 | Ti, W, V, Cu, Fe | Kneading method | 79 | 90 | 72 | 83 |
| 7 | Ti, W, V, Cr, | Kneading method | 80 | 89 | 73 | 83 |
| 8 | Ti, W, V, Cu, | Kneading method | 81 | 89 | 72 | 82 |
| 9 | Ti, W, V, Fe | Kneading method | 80 | 88 | 70 | 81 |
| 10 | Ti, W, V, Cr, Cu, Fe | Impregnatio method | 79 | 88 | 71 | 82 |
| 11 | Ti, W, V, Cr, Cu, Fe | Impregnatio method | 78 | 87 | 70 | 81 |

TABLE 1-continued

| Honey-comb catalyst No. | Catalyst Composition | Co-catalyst carrying method | Gas Composition (1) 280° C. | Gas Composition (1) 350° C. | Gas Composition (2) 280° C. | Gas Composition (2) 350° C. |
|---|---|---|---|---|---|---|
| 12 | Ti, W, V, Cr, Cu, Fe | Impregnatio method | 77 | 87 | 71 | 83 |
| 13 | Ti, Si, W, V, Cr, Cu, Fe | Kneading method | 81 | 88 | 70 | 84 |
| Comparative 1 | Ti, W, V | None | 83 | 89 | 45 | 61 |

From the above-described test results, it was confirmed that according to the present invention, by adding a co-catalyst (at least one kind of chromium, copper, and iron) to a basic denitrifying component (titanium, tungsten, vanadium), high denitrification activity is attained even under a high $NO_2$ exhaust gas condition such as gas condition (2).

As is apparent from the above description, according to the present invention, there are provided a catalyst for removing nitrogen oxides, which is capable of keeping sufficient denitrification performance, i.e., a high removal rate of nitrogen oxides in exhaust gas having a high $NO_2$ content especially under a condition that the ratio of $NO_2/NO$ in exhaust gas is 1 or higher, a catalyst molded product therefor, and an exhaust gas treating method.

Example 3

(Preparation of Catalyst)

In a denitrifier of gas turbine combined cycle using liquefied natural gas as a fuel, a honeycomb catalyst (pitch: 4.2 mm, wall thickness: 0.78 mm) having been used for about 94,000 hours was taken as a sample. This sample was used as catalyst A, being the second catalyst. Catalyst A had a composition of $TiO_2:V_2O_6:WO_3=1:0.05:0.08$ by weight ratio.

Next, a solution in which chromium nitrate [$Cr(NO_3)_3 \cdot 9H_2O$] and copper nitrate [$Cu(NO_3)_2 \cdot 3H_2O$] were dissolved in water was prepared. The concentration of the solution was adjusted so as to match the water absorption coefficient of catalyst A, and the solution was impregnated and dried, and subsequently was fired at 500° C. for three hours to obtain catalyst B. Catalyst B had a composition of $TiO_2:V_2O_6:WO_3:CuO:Cr_2O_3=1:0.05:0.09:0.0059:0.0112$ by weight ratio. Catalyst B can also contain a molybdenum oxide.

(Nitrogen Oxides Removal Test)

Catalyst A prepared as described above and catalyst B, which is the first catalyst, (both catalysts had a cross section of 10 holes×11 holes and a length of 350 mm) were arranged as given in Table 2, and NOx removal performance tests were conducted under the test conditions given in Table 3.

First, $NH_3$ was added so that $NH_3/NOx$ mole ratio was 1.04 with respect to the inlet NOx concentration (NO: 60 ppm, $NO_2$: 20 ppm). After it was checked that the outlet NOx concentration was stable, the NO concentration was decreased from 60 ppm to 5 ppm with the $NO_2$ concentration being fixed (20 ppm) to render the inlet NOx concentration about 25 ppm. The amount of added $NH_3$ was decreased simultaneously with the decrease in NO concentration, and the NO concentration and $NH_3$ concentration were adjusted gradually by taking 15 minutes so that the $NH_3$ concentration decreased from 83 ppm to 29 ppm. The $NH_3/NOx$ mole ratio at this time was 1.16, which corresponded to the NOx removal performance test assuming low load.

The NOx concentration and NO concentration at the inlet and outlet were measured by using a chemiluminescence NOx analyzer. The inlet $NH_3$ concentration was determined from the calculated value, and the outlet $NH_3$ concentration was measured by wet analysis.

TABLE 2

| | | Test item | | | |
|---|---|---|---|---|---|
| | | NOx concentration (ppm) | | $NH_3$ concentration (ppm) | $NH_3/Nox$ mole ratio |
| Run | Catalyst arrangement | NO | $NO_2$ | 83→29 | 1.04→1.16 |
| 1 | →Catalyst A→Catalyst A→Catalyst A→Catalyst A→ | 60→5 | 20 | 83→29 | 1.04→1.16 |
| 2 | →Catalyst A→Catalyst A→Catalyst B→Catalyst B→ | 60→5 | 20 | 83→29 | 1.04→1.16 |
| 3 | →Catalyst B→Catalyst B→Catalyst A→Catalyst A→ | 60→5 | 20 | 83→29 | 1.04→1.16 |
| 4 | →Catalyst B→Catalyst A→Catalyst A→Catalyst A→ | 60→5 | 20 | 83→29 | 1.04→1.16 |
| 5 | →Catalyst B→Catalyst B→Catalyst B→Catalyst B→ | 60→5 | 20 | 83→29 | 1.04→1.16 |

TABLE 3

| Test Conditions | |
|---|---|
| Catalyst shape | 42.8 mm × 47.2 mm × 350 mm L × four |
| Gas amount | 20.37 m³N/h |
| Ugs | 2.80 mN/sec |
| AV | 9.6 m³N/m²h |
| Gas temperature | 260° C. |
| Gas composition | NOx Given in Table 2 |
| | $NH_3$ Given in Table 2 |
| | $O_2$ 15.8% |
| | $CO_2$ 5% |
| | $H_2O$ 5% |
| | $N_2$ Balance |

FIG. 1 shows behaviors of outlet NOx concentration and NO concentration at the time when the inlet NOx concentration was decreased from 80 ppm (NO: 60 ppm, $NO_2$: 20 ppm) at high load to 25 ppm (NO: 5 ppm, $NO_2$: 20 ppm) at low load.

Table 4 gives the measurement results of outlet NOx concentration and NO concentration at high load and outlet NOx concentration and NO concentration at low load (values after 45 minutes).

TABLE 4

| | | Test result | | | |
| | | High load | | Low load | |
| Run | Catalyst arrangement | Nox concentration (ppm) | NO concentration (ppm) | Nox concentration (ppm) | NO concentration (ppm) |
| --- | --- | --- | --- | --- | --- |
| 1 | Catalyst A-Catalyst A-Catalyst A-Catalyst A | 0.2 | 0.2 | 9.6 | <0.1 |
| 2 | Catalyst A-Catalyst A-Catalyst B-Catalyst B | 0.6 | 0.6 | 7.2 | 1.9 |
| 3 | Catalyst B-Catalyst B-Catalyst A-Catalyst A | 0.3 | 0.3 | 0.5 | <0.1 |
| 4 | Catalyst B-Catalyst A-Catalyst A-Catalyst A | 0.2 | 0.2 | 2.4 | <0.1 |
| 5 | Catalyst B-Catalyst B-Catalyst B-Catalyst B | 0.3 | 0.3 | 0.3 | <0.1 |

FIG. 1 shows a change with time of outlet NOx concentration, which shows the effect of the nitrogen oxides removing method of the present invention. In Run 1, only catalysts A were arranged, in Run 2, catalysts B (½ amount) were arranged on the downstream side of catalysts A (½ amount), in Run 3, catalysts A (½ amount) were arranged on the downstream side of catalysts B (½ amount), in Run 4, catalysts A (¾ amount) were arranged on the downstream side of catalyst B (¼ amount), and in Run 5, only catalysts B were arranged.

The following were made apparent from FIG. 1 and Table 4.

At an inlet NOx concentration of 80 ppm (NO: 60 ppm, $NO_2$: 20 ppm) assuming high load, although the NOx concentration was as high as 80 ppm, the outlet NOx concentration decreased to 0.6 ppm or lower when only catalysts A of the conventional composition were arranged, when only catalysts B excellent in $NO_2$ removal performance were arranged, or when catalyst A and catalyst B were combined, so that an NOx removal rate of 99% or higher was obtained.

On the other hand, at an inlet NOx concentration of 25 ppm (NO: 5 ppm, $NO_2$: 20 ppm) assuming low load, differences in outlet NOx concentration were found, and the outlet NOx concentration decreases in the order of catalysts A only, catalysts A (½)+catalysts B (½), catalyst B (¼)+catalysts A (¾), catalysts B (½)+catalysts A (½), and catalysts B only.

In particular, a large difference in outlet NOx concentration was found depending on the combination of catalyst A and catalyst B. When catalysts B (½) of the present invention were arranged on the upstream side, the outlet NOx concentration was 0.5 ppm, so that the NOx removal rate was 98%. On the other hand, when catalysts A (½) were arranged on the upstream side, the outlet NOx concentration was 7.2 ppm, so that the NOx removal rate was 71%. Thus, a remarkable difference in NOx removal rate was found.

Also, a difference in NOx removal rate was scarcely found between the case where catalysts B (½) of the present invention were arranged on the upstream side and the case where only catalysts B were arranged.

The above-described catalyst for removing nitrogen oxides, which is arranged by combining catalyst B excellent in $NO_2$ removal performance and catalyst A of the conventional composition excellent in NO removal performance, has the following advantages, and provides a practical method for removing nitrogen oxides in exhaust gas.

(1) In exhaust gas in which the NO concentration and $NO_2$ concentration vary greatly from load fluctuations, high NOx removal performance can be maintained for all loads.

(2) When a denitrification catalyst is charged into the existing denitrifier and is being operated smoothly in a state in which a decrease in catalyst performance is scarcely recognized, and the catalyst can still be used continuously, the existing denitrification catalyst is taken out, and a composite oxide of copper and chromium is impregnatingly carried thereon, subsequently the produced catalyst being recharged. Thereby, the existing denitrification catalyst can be reused, by which effective utilization of resources is achieved, and hence a more economical denitrifying method is provided.

Example 4

(Combined Cycle Power Generation Facility)

Figure 2:
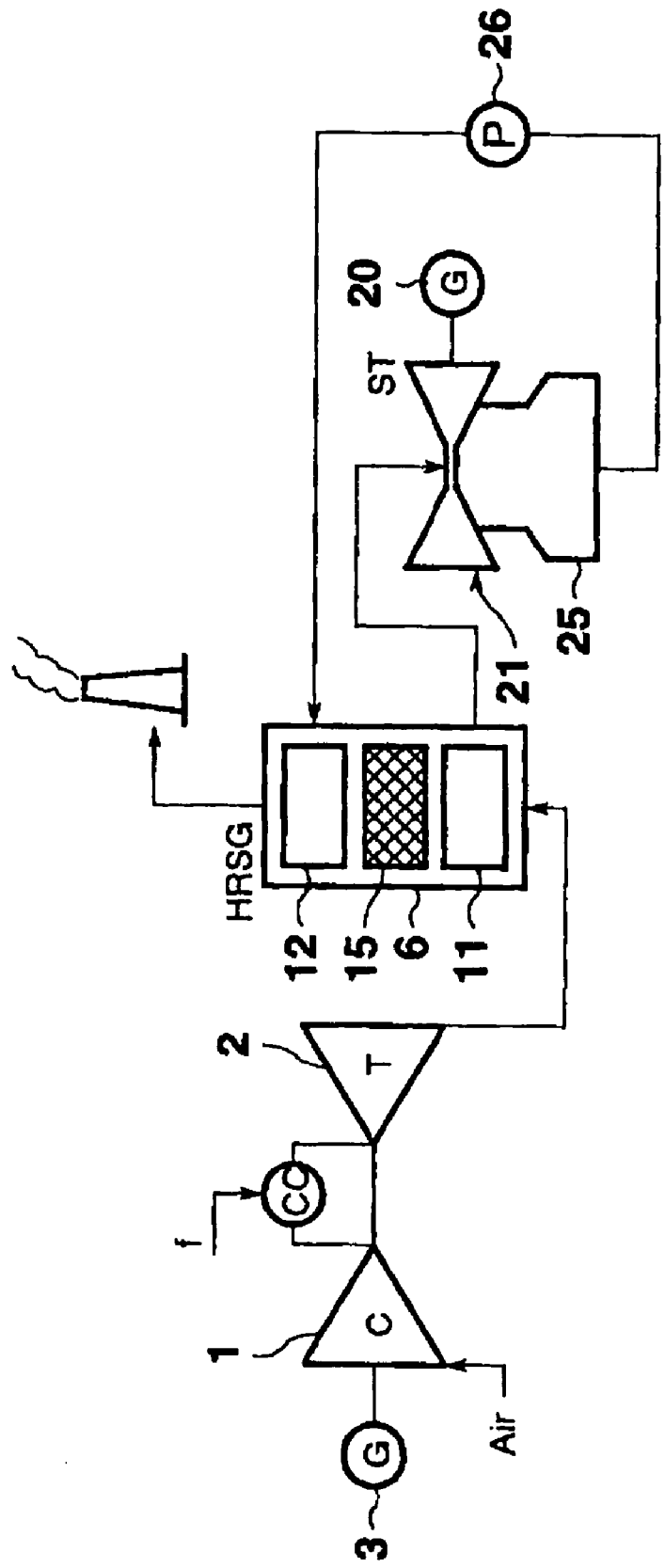
FIG. 2 is a schematic view of a combined cycle power generation facility in accordance with one embodiment of the present invention.

A combined cycle power generation facility provided with the above-described catalyst for removing nitrogen oxides will be explained with reference to FIG. 2. FIG. 2 shows a schematic configuration of a combined cycle power generation facility in accordance with one embodiment of the present invention.

As shown in FIG. 2, a gas turbine facility 4 which has a compressor 1 and a gas turbine 2 and is connected with a generator 3 is provided. Compressed air having been compressed by the compressor 1 is sent to a combustor 5 and is burned together with a fuel. The combustion gas is supplied from the combustor 5 to the gas turbine 2. The gas turbine 2 is driven by the expansion of combustion gas to obtain an output, by which electric power is generated. Exhaust gas having finished work in the gas turbine 2 is discharged into the atmosphere after heat is recovered (steam is generated) by an exhaust heat recovery boiler 6.

The exhaust heat recovery boiler 6 has high-temperature side heating means 11 and low-temperature side heating means 12. In a gas duct between the high-temperature side heating means 11 and the low-temperature side heating means 12, the above-described catalyst for removing nitrogen oxides (denitrification catalyst) 15 is provided. The steam obtained by the high-temperature side heating means 11 is sent to a steam turbine 21 connected with a generator 20, and the steam turbine 21 is driven by the expansion of steam to obtain an output, by which electric power is generated.

Exhaust steam having finished work in the steam turbine 21 is condensed by a condenser 25. The condensed water condensed by the condenser 25 is supplied to the low-temperature side heating means 12 of the exhaust heat recovery boiler 6 by a feed pump 26.

In the combined cycle power generation facility having the exhaust heat recovery boiler 6 provided with the denitrification catalyst 15, the denitrification catalyst 15 in which catalyst B excellent in $NO_2$ removal performance and catalyst A of the conventional composition excellent in NO removal performance are combined is provided in an exhaust gas treatment system. Therefore, a combined cycle power generation facility can be provided in which high NOx removal performance is maintained for all loads even in exhaust gas under an operating condition that the NO concentration and $NO_2$ concentration are varied greatly by load fluctuations. Also, by charging catalyst B into the existing denitrifier, or by taking out the existing denitrification catalyst and impregnatingly carrying a composite oxide of copper and chromium thereon, and by subsequently recharging the produced catalyst, the existing denitrification catalyst can be reused, by which effective utilization of resources is achieved with a low cost, and hence a more economical combined cycle power generation facility can be provided.

The present invention provides a catalyst for removing nitrogen oxides which is capable of keeping sufficient denitrification performance, i.e., a high nitrogen oxides removal rate in exhaust gas having a high $NO_2$ content especially under a condition that the ratio of $NO_2/NO$ in exhaust gas is 1 or higher, a catalyst molded product therefor, and exhaust gas treating method.

Also, the present invention provides a catalyst for removing nitrogen oxides which solves a problem with the conventional method for removing nitrogen oxides in exhaust gas and is capable of always keeping high NOx removal performance especially without being affected by the variations in NO concentration and $NO_2$ concentration in exhaust gas, a catalyst molded product therefor, and an exhaust gas treating method.

Also, the present invention provides a combined cycle power generation facility having an exhaust gas treating system capable of keeping a high nitrogen oxides removal rate.

The invention claimed is:

1. A catalyst configuration for removing nitrogen oxides in exhaust gas by reduction in the presence of ammonia, wherein a first catalyst which is highly active in removing nitrogen dioxide is arranged on the upstream side in the exhaust gas flow direction, said catalyst configuration comprising:
    a first catalyst which is highly active in removing nitrogen dioxide is arranged on the upstream side in the exhaust gas flow direction, said first catalyst comprising a chromium oxide, and
    a second catalyst which is active in removing nitrogen monoxide which is arranged on the downstream side of said first catalyst in the exhaust flow direction, said second catalyst comprising a titanium oxide and at least one oxide selected from the group consisting of vanadium oxides, tungsten oxides and molybdenum oxides.

2. The catalyst configuration according to claim 1, wherein greater than or equal to ¼ and less than ⅘ of an upstream catalyst flow path length in the exhaust gas flow direction is constituted by said second catalyst, and
    a downstream catalyst flow path length in the exhaust gas flow direction is constituted by said first catalyst.

3. The catalyst configuration according to claim 1, wherein said second catalyst comprises a titanium oxide, a vanadium oxide and a tungsten oxide.

4. The catalyst configuration according to claim 3, wherein greater than or equal to ¼ and less than ⅘ of an upstream catalyst flow path length in the exhaust gas flow direction is constituted by said second catalyst, and
    a downstream catalyst flow path length in the exhaust gas flow direction is constituted by said first catalyst.

5. The catalyst configuration according to claim 3, wherein said second catalyst further comprises a molybdenum oxide.

6. The catalyst configuration according to claim 5, wherein greater than or equal to ¼ and less than ⅘ of an upstream catalyst flow path length in the exhaust gas flow direction is constituted by said second catalyst, and
    a downstream catalyst flow path length in the exhaust gas flow direction is constituted by said first catalyst.

* * * * *

UNITED STATES PATENT AND TRADEMARK OFFICE
CERTIFICATE OF CORRECTION

PATENT NO.        : 7,413,715 B2                                          Page 1 of 1
APPLICATION NO. : 10/822441
DATED             : August 19, 2008
INVENTOR(S)       : Nojima et al.

It is certified that error appears in the above-identified patent and that said Letters Patent is hereby corrected as shown below:

On the Title Page:

Item 73, Assignee:   Please correct "itsubishi Heavy Industries, Ltd., Tokyo (JP)"
                     To read -- Mitsubishi Heavy Industries, Ltd., Tokyo (JP) --

Signed and Sealed this

Twenty-eighth Day of October, 2008

JON W. DUDAS
*Director of the United States Patent and Trademark Office*